(12) United States Patent
Maser et al.

(10) Patent No.: US 6,846,147 B2
(45) Date of Patent: Jan. 25, 2005

(54) LOADING AND UNLOADING DEVICE FOR A FURNACE WAGON

(75) Inventors: Herbert Maser, Korntal (DE); Reiner Starz, Weil der Stadt (DE)

(73) Assignee: Eisenmann Maschinenbau KG (DE)

( * ) Notice: Subject to any disclaimer, the term of this patent is extended or adjusted under 35 U.S.C. 154(b) by 0 days.

(21) Appl. No.: 10/213,398

(22) Filed: Aug. 6, 2002

(65) Prior Publication Data

US 2004/0028508 A1 Feb. 12, 2004

(51) Int. Cl.[7] ................................................. B65F 9/00
(52) U.S. Cl. .............................. 414/331.09; 414/331.11; 414/331.17
(58) Field of Search ...................... 414/331.06, 331.09, 414/331.11, 331.15, 331.17

(56) References Cited

U.S. PATENT DOCUMENTS

| 664,711 | A | * | 12/1900 | Ayotte et al. | ........... | 414/331.09 |
| 3,075,656 | A | * | 1/1963 | Pearne | .................... | 414/331.1 |
| 5,622,470 | A | * | 4/1997 | Schaefer et al. | ............ | 414/807 |
| 6,074,156 | A | * | 6/2000 | Frich | ...................... | 414/331.01 |
| 6,629,812 | B1 | * | 10/2003 | Lee et al. | ................. | 414/788.8 |

FOREIGN PATENT DOCUMENTS

DE            44 16 214 C2  *  9/1996

* cited by examiner

*Primary Examiner*—Joe Dillon, Jr.
(74) *Attorney, Agent, or Firm*—Factor & Lake (57) ABSTRACT

A device for loading firing, sintering or drying material onto and unloading it from the shelving frame of a furnace wagon is disclosed herein as having a first lifting device (3) that includes a shifting cradle (45), and a second lifting device (2) disposed at a distance from the first lifting device so that a shelving frame (8) is accommodated between the two lifting devices. The second lifting device includes a lifting cradle (15) capable of travel in the vertical direction, and a conveyer system carried by the lifting cradle. Further, the device includes an interlocking apparatus (33) for coupling the shifting cradle in an extended position to the lifting cradle (15) of the second lifting device (2). When coupled using the interlocking apparatus, the vertical movements of the two lifting cradles are synchronized.

6 Claims, 6 Drawing Sheets

LOADING AND UNLOADING DEVICE FOR A FURNACE WAGON

The invention relates to a device for loading firing, sintering or drying material onto, and unloading it from, the shelving frame of a furnace waggon, the said device having a) a first lifting device which, for its part, comprises:
   aa) a lifting cradle capable of travel in the vertical direction;
   ab) a shifting cradle carried by the lifting cradle and capable of horizontal travel in relation to the latter;
   ac) a conveyer system carried by the shifting cradle.

A device of this kind which has only a single lifting device is described in DE 44 16 214 C2. In this device, the material is placed, when the shelving frame is being loaded with the shifting cradle in a retracted position, on that end region of the conveyer system which faces away from the shelving frame. The shifting cradle is thereupon moved, with its front, empty end region, into the intervening space between the shelving plane to be loaded and the shelving plane lying below it, and is then raised until the conveyer plane of the conveyer system lies above those prisms of the shelving frame on which the material is to be set down. The conveyer system is now started, so that the material is brought into that region of the conveyer system which lies above the prisms to be loaded.

The material can now be set down on these prisms by lowering the lifting cradle. Finally, the shifting cradle is moved back out of the shelving frame again and a new loading cycle can begin.

With the aid of the known device, the unloading of a shelving frame takes place with the sequence of movements reversed in an analogous manner.

What is disadvantageous in the case of the known device is that the shifting cradle juts out a long way in the loading and unloading position, in which it is moved, with one region, into the shelving frame. The moments which arise as a result of this can be absorbed with reasonable outlay in terms of design only when the materials are relatively light in weight.

The object of the present invention is to provide a device of the type initially mentioned, with the aid of which even very heavy materials can be loaded onto, or removed from, a shelving frame.

This object is achieved, according to the invention, through the fact that the device also comprises:

b) a second lifting device which is disposed at a distance from the first lifting device such that the shelving frame is accommodated between the two lifting devices, and which comprises:
   ba) a lifting cradle capable of travel in the vertical direction;
   bb) a conveyer system carried by the lifting cradle;
c) an interlocking apparatus with the aid of which the shifting cradle of the first lifting device can be mechanically coupled, in an extended position, to the lifting cradle of the second lifting device;
d) the vertical movements of the two lifting cradles being synchronised in the period in which the shifting cradle of the first lifting device is mechanically coupled to the lifting cradle of the second lifting device by the interlocking apparatus.

As a result of the configuration of the device in accordance with the invention, success is achieved in relieving the shifting cradle of the first lifting device of weight in the period in which it juts out freely in order to be able to travel in between the shelving planes of the shelving frame. Only when that end of the shifting cradle of the first lifting device which adjoins the second lifting device is mechanically coupled to the lifting cradle of the second lifting device, and the weights acting upon the shifting cradle can therefore be conducted away via the two lifting devices, are the materials moved onto the shifting cradle penetrating the shelving frame. Subsequent lifting or lowering movements also take place in this mechanically coupled condition, in which the shifting cradle of the first lifting device is no longer exposed to major moments of flexion. In this way, very heavy materials can be loaded onto the shelving frame, or removed from the latter again, without any difficulties.

It is expedient if a light barrier apparatus is provided which monitors the space between the two ends, which face one another, of the shifting cradle of the first lifting device, and of the lifting cradle of the second lifting device.

In order to be able to scan two-dimensionally the space to be monitored, this light barrier apparatus may comprise a linear array of individual light sources and an array of individual light-detectors which is substantially linear in relation thereto.

Before, therefore, the shifting cradle of the first lifting device travels into the shelving frame, a check is carried out as to whether the space necessary for this purpose is clear. If this is not the case, the movement of the shifting cradle is stopped and a warning signal generated.

The interlocking apparatus may have at least one bolt which is displaceable in the horizontal direction and which is guided on the lifting cradle of the second lifting device or on the shifting cradle of the first lifting device and engages with an end region in one position in a receptacle on the shifting cradle of the first lifting device or on the lifting cradle of the second lifting device. Via this bolt, of which there is at least one and which must be suitably dimensioned, the vertically directed forces are then partially transmitted from the shifting cradle of the first lifting device to the lifting cradle of the second lifting device.

The bolt may have a freely rotatable roller at its end. This facilitates the introduction of the bolt into the corresponding receptacle.

In an advantageous form of embodiment of the invention, the control systems for the lifting movements of the two lifting cradles are connected as master and slave for the purpose of synchronising the lifting movement. As a result of this, it is possible to obtain an absolutely synchronous movement, such as is essential for joint, mechanically coupled movement of the two lifting cradles.

An exemplified embodiment of the invention will be explained in greater detail below with the aid of the drawings, in which.

With the aid of the device which is represented in the drawings and described below, heavy aluminium sintering parts, which have a weight of about 150 kg each, are to be loaded in the untreated condition onto a furnace waggon which then conveys the said aluminium parts through a sintering furnace. After the firing operation, the aluminium sintering parts are removed from the furnace waggon again in rows with the aid of the same device.

Figure 1:
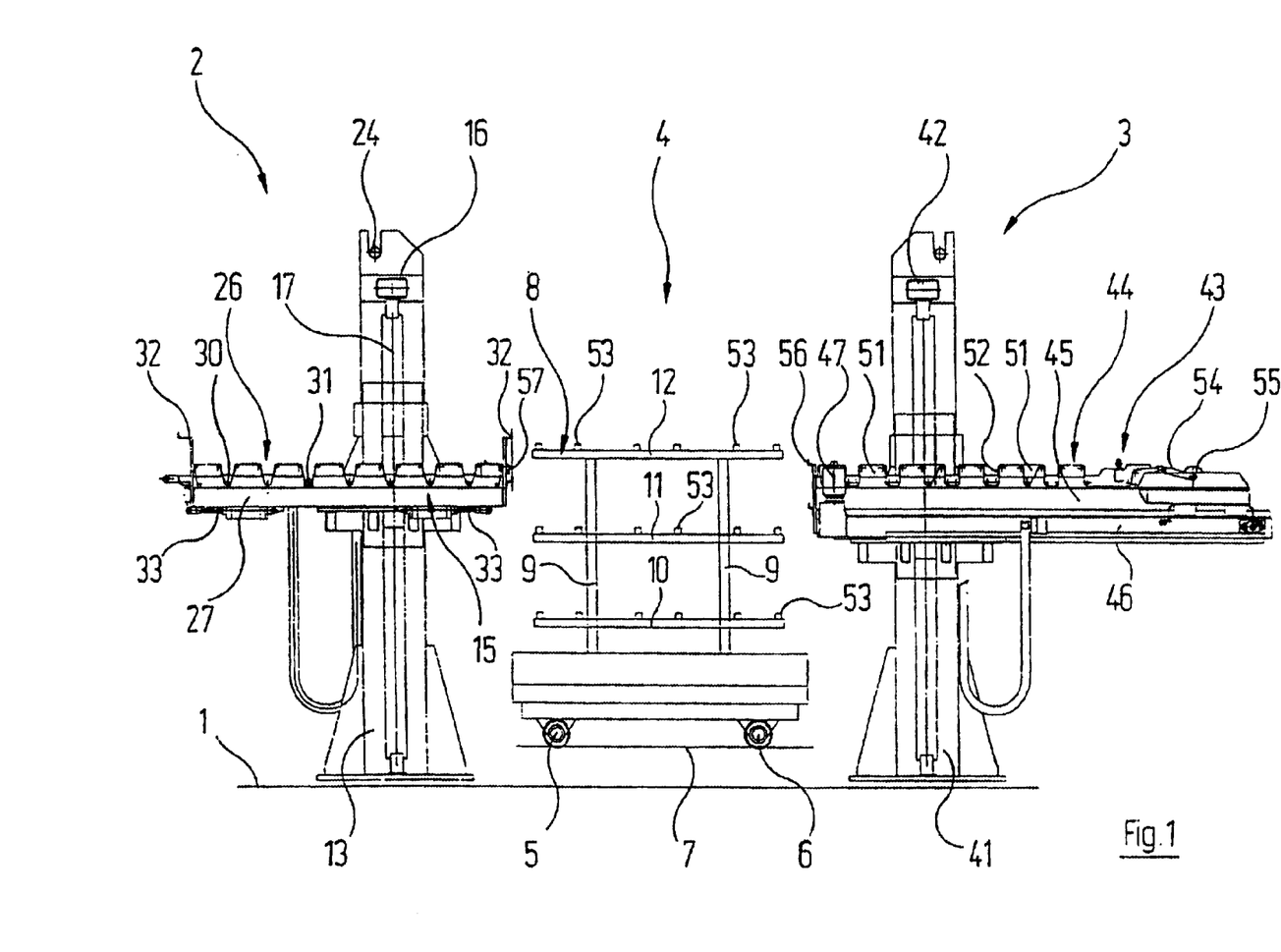
FIG. 1 shows, in a diagrammatic side view and in a first working position, a device for loading heavy aluminium sintering parts onto, and unloading them from, a furnace waggon.
Figure 2:
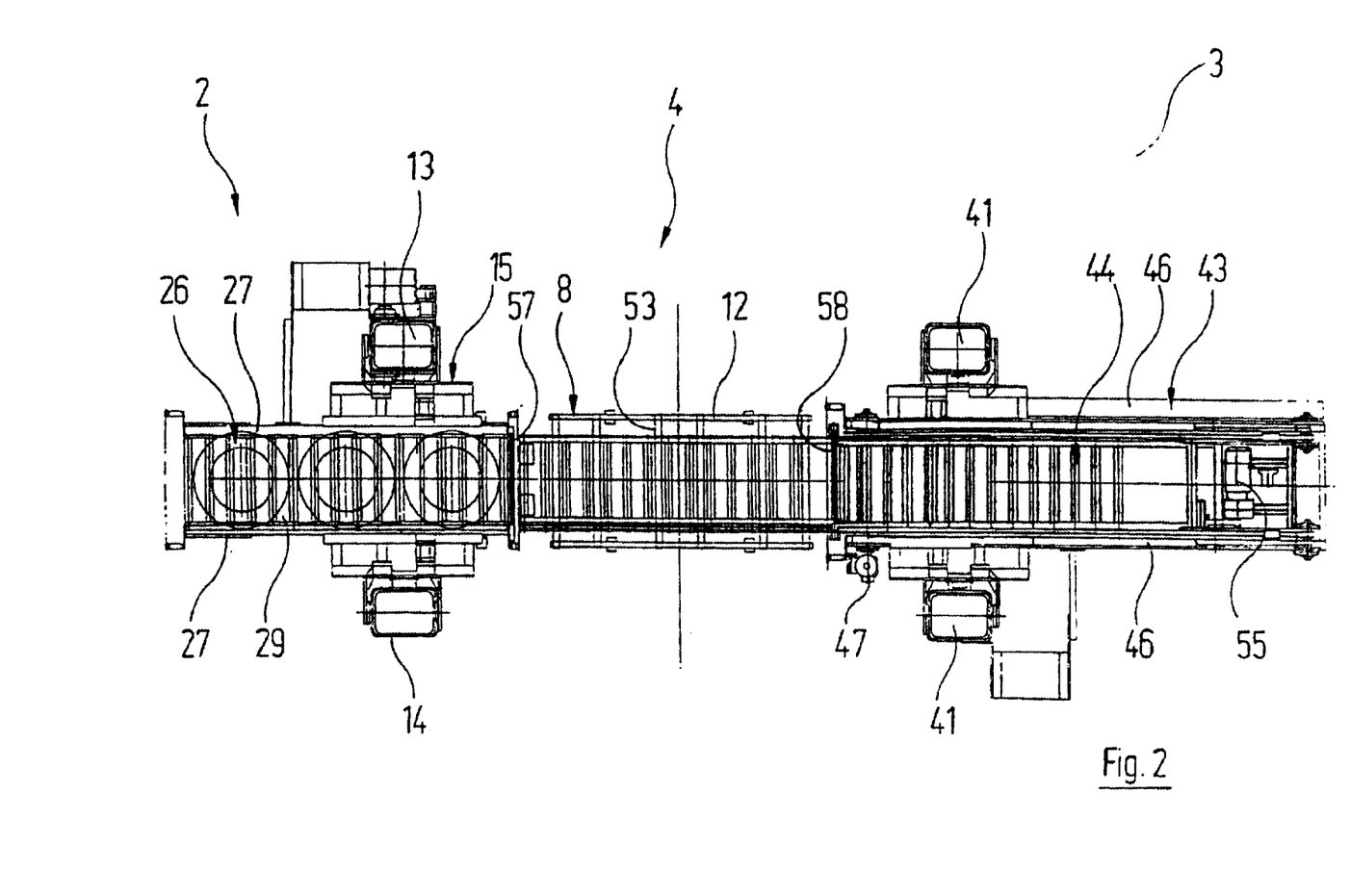
FIG. 2 shows the top view of the device in FIG. 1.

FIGS. 1 and 2 are referred to first of all. As these show, the loading and unloading device comprises two lifting gantries 2 and 3 which are disposed at a distance from one another and are fastened to the floor 1 of the room. Located between the two lifting gantries 2 and 3 is a furnace waggon 4 which stands with its wheels 5, 6 on a shifting apparatus 7 which is represented only diagrammatically. With the aid of the shifting apparatus 7, the furnace waggon 4 is brought, by the loop of track which leads through the sintering furnace, between the two lifting gantries 2 and 3, perpendicularly to the plane of the drawing in FIG. 1, for loading and unloading with the aid of the said shifting apparatus 7. In known manner, the furnace waggon 4 carries a shelving frame 8 which, for its part, consists of vertically extending columns 9 and carrying grids 10, 11, 12 which are held by the said columns in different horizontal shelving planes. The aluminium sintering parts which are to be fired, or which have been fired, are put onto the carrying grids 10, 11, 12 either directly or via a firing plate.

Figure 4:
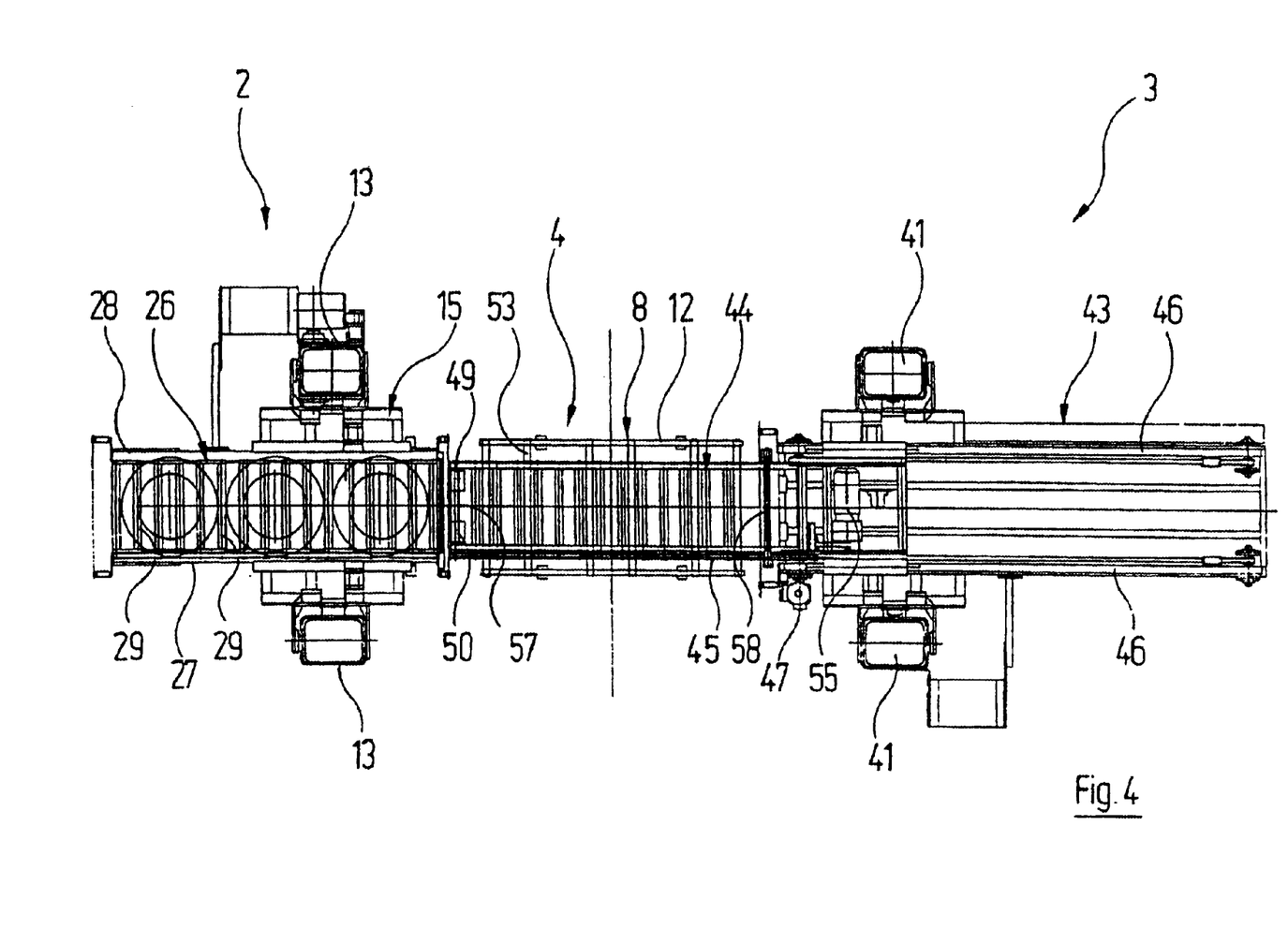
FIG. 4 shows the top view of the device in FIG. 3.
Figure 5:
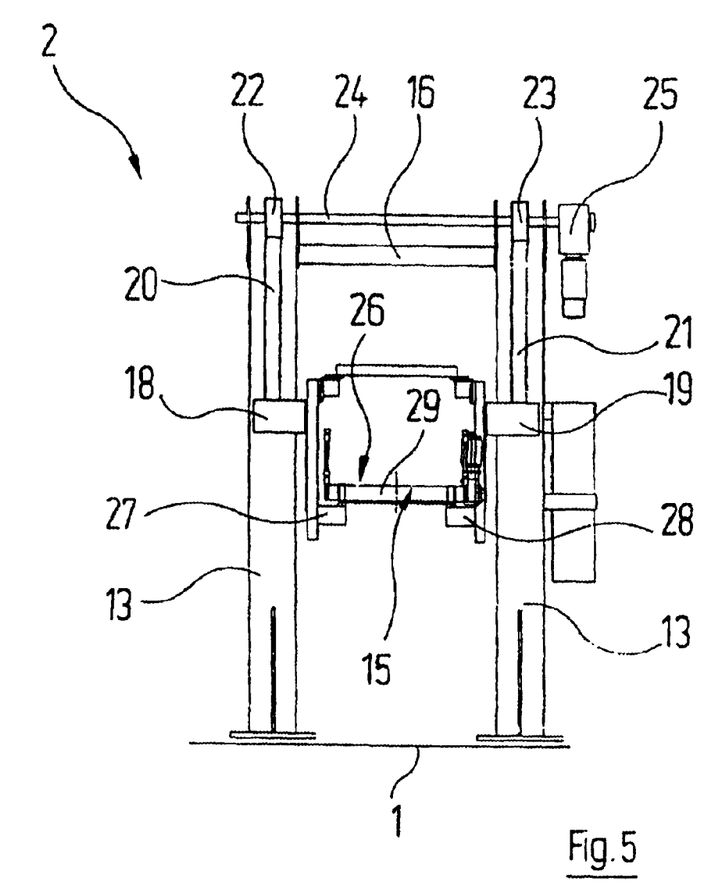
FIG. 5 shows the side view of a lifting gantry which is part of the device in FIGS. 1 to 4.

The lifting gantry 2 represented in FIG. 1 to the left of the furnace waggon 4 comprises two vertically extending pillars 13 (cf. FIGS. 4 and 5) which are connected to one another in their upper region by a transverse girder 16 and on which a lifting cradle 15 is guided in a vertically displaceable manner. The guides 17 for the lifting cradle 15 are disposed on the inner sides of the pillars 13 in each case, as can be seen in a very diagrammatic manner in FIG. 1. As FIG. 5 shows, the lifting cradle 15 possesses, on each of its opposing sides, a fastening extension 18 and 19 respectively, to each of which there is fastened one end of a toothed belt 20 and 21 respectively. The toothed belts 20 and 21 are each guided over toothed belt pulleys 22, 23 and connected, at their ends which hang down on the opposite side of the said toothed belt pulleys 22, 23, to a compensating weight which is not represented. The toothed belt pulleys 22, 23 are seated, in a rotationally locked manner, on a common, horizontal drive shaft 24 which can be turned by a driving motor 25.

The lifting cradle 15 carries a roller-type conveyer system which is designated, as a whole, by the reference symbol 26. This system comprises two longitudinal girders 27 which extend parallel to one another and horizontally and which, as is particularly shown by FIGS. 1 and 3, protrude laterally beyond the pillars 13 of the lifting gantry 2 on either side. Rotatably mounted on the longitudinal girders 27 are the opposed ends of conveyer rollers 29 which are driven in an end region by an endless belt 30 (cf. FIGS. 1 and 3). The endless belt 30 is guided over the various conveyer rollers 29 and also over various tensioning rollers. So as not to overburden the drawings, the conveyer rollers 29 and tensioning rollers are symbolised only by their axial crosses and are not, themselves, represented. What is indicated in the drawing, however, is a driving roller 31 which, at the same time, assumes the function of a tensioning roller and is connected to a driving motor which is not visible. The endless belt 30 is thus set in motion by rotation of the driving roller 31, and in turn sets all the conveyer rollers 29 and tensioning rollers in rotation.

Figure 3:
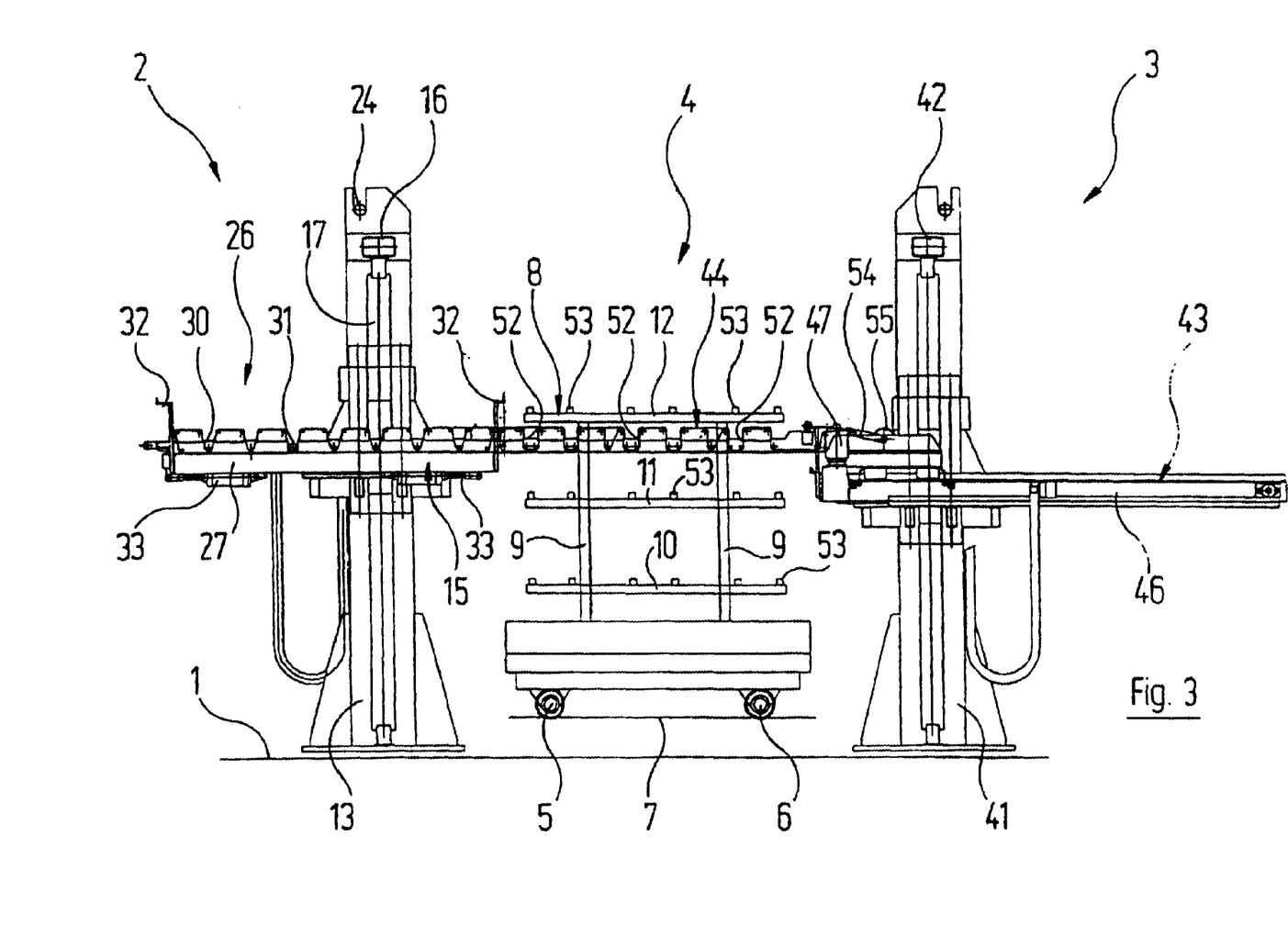
FIG. 3 shows the device in FIGS. 1 and 2, but in a second working position.

The longitudinal girders 27 also each carry, at their opposed ends, a light barrier 32 whose light beams extend vertically and serve to monitor, in a way which is of no further interest here, the gap in relation to the adjoining device in each case.

The front and rear ends of the longitudinal girders 27 are also each provided with an interlocking apparatus 33, which apparatuses serve, as will again become clear later on, to provide the mechanically stable connection between the corresponding ends of the lifting cradle 15 and the other devices which are to be connected thereto.

Figure 7:
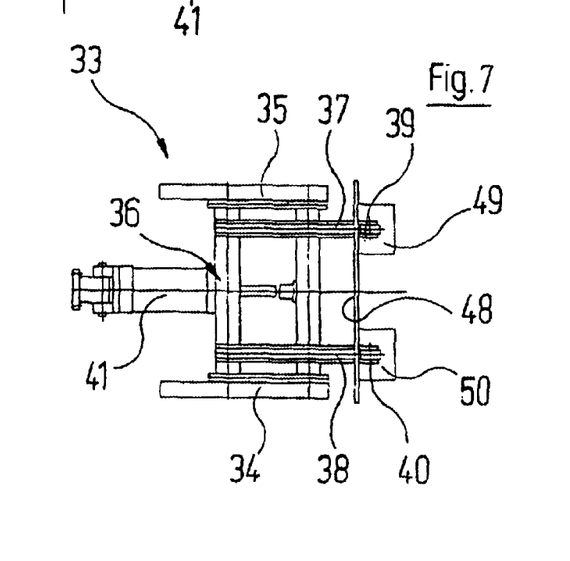
FIG. 7 shows an isolated side view of the interlocking apparatus.
Figure 8:
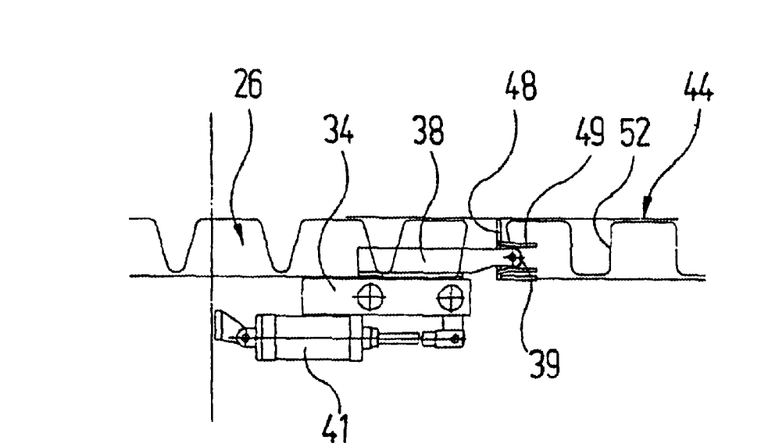
FIG. 8 shows a top view of the interlocking apparatus in FIG. 7.

The construction of the interlocking apparatus 33 is represented in greater detail in FIGS. 7 and 8. It comprises two parallel, horizontally extending guides 34, 35 which are fastened to the longitudinal girders 27, 28 (the said longitudinal girders are not drawn in in FIGS. 7 and 8). Guided in a horizontally and linearly displaceable manner between the guides 34, 35 is an interlocking cradle 36 which has two projecting bolts 37, 38 which are each provided at their ends with a roller 39, 40. The interlocking cradle 36 can be moved to and fro with the aid of a pneumatic cylinder 41 which is connected at one end to the longitudinal girders 27 in an articulated manner, and at the other end to the lifting cradle 36 in an articulated manner.

The lifting gantry 3 which is represented to the right of the furnace waggon 4 in FIGS. 1 and 3 possesses a similar construction to the lifting gantry 2 described above. That is to say, it likewise possesses two vertical pillars 41 of which only one can be seen in FIGS. 1 and 3 and which are connected to one another at the top by a transverse girder 42. A lifting cradle, which is provided, as a whole, with the reference symbol 43, is capable of vertical travel on the pillars 14, which purpose is served by a toothed belt drive which cannot be seen in detail in FIGS. 1 and 3, but which corresponds to that of the lifting gantry 2.

The lifting cradle 43 also carries a roller-type conveyer system 44. But whereas the roller-type conveyer system 26 of the lifting gantry 2 on the left in FIGS. 1 and 3 is rigidly connected to the lifting cradle 15, the roller-type conveyer system 44 of the lifting gantry 3 is located on a shifting cradle 45 which is guided on the longitudinal girders 46 of the lifting cradle 43 so as to be displaceable in their longitudinal direction. This longitudinal displacement of the shifting cradle 45 is brought about with the aid of a driving motor 47 fastened to the longitudinal girders 46 of the lifting gantry 3.

Those ends of the longitudinal girders 46 of the lifting gantry 3 which point towards the left in FIGS. 1 and 3 are connected to a transversely extending profile 48 (cf. FIGS. 6 and 8), to which two bolt receptacles 49, 50 are fastened. The said bolt receptacles 49, 50 cooperate, in a manner which will be explained later on, with the bolts 37, 38 of the interlocking apparatus 33 at the right-hand end of the lifting cradle 15 of the lifting gantry 2 on the left in FIG. 1.

Figure 6:
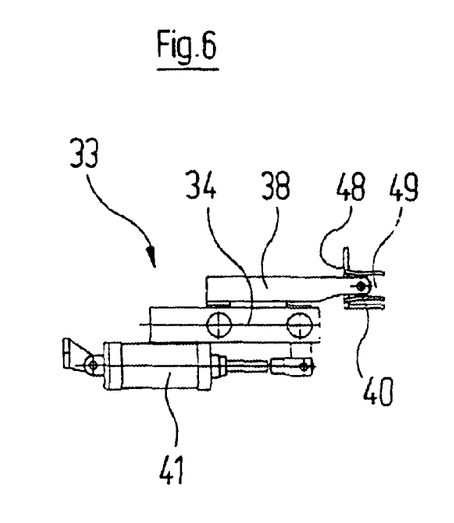
FIG. 6 shows the side view of an interlocking apparatus, which is part of the device in FIGS. 1 to 5, together with adjoining parts of the lifting gantries, which are connected by the said interlocking apparatus.

As can be gathered both from FIGS. 1 and 3 and also from FIG. 6, bearing blocks 51, on which the conveyer rollers, which cannot be seen in FIG. 1, of the roller-type conveyer 44 are mounted, are fastened at distances from one another on the longitudinal girders 46, so that gaps 52 are produced between them. The distances between the gaps 52 are, once again, identical to the distances between the prisms 53 which, as part of the carrying grids 10, 11, 12 of the furnace waggon 4, carry the material in the individual shelving planes. Since these distances are not constant, as can be gathered, in particular, from FIGS. 1 and 2, two or three conveyer rollers between adjoining gaps lie in an alternating manner between adjoining gaps 52 on the shifting cradle 45 of the lifting gantry 3. In places where three conveyer rollers are provided between two adjoining gaps 52, an additional tensioning roller serves to impart an adequate angle of wrap to the middle conveyer roller too.

The driving motor 55 for the endless belt 54 which drives the conveyer rollers of the lifting gantry 3 and which, for that purpose, is wrapped around these and also around corresponding tensioning rollers, is located at that end of the shifting cradle 45 which is the right-hand end in FIGS. 1 to 4.

The shifting cradle 45 is also provided, at its end which faces towards the lifting gantry 2, with a light barrier 56 whose light beams are directed perpendicularly for the purpose of monitoring the corresponding space immediately adjoining the shifting cradle 45.

Finally, that end of the lifting cradle 15 of the left-hand lifting gantry 2 which faces towards the right-hand lifting gantry 3 is equipped with a light-transmitter 57 which comprises a linear array of individual light sources, for example LED's. The light-transmitter 57 cooperates, after the fashion of a light barrier, with a light-receiver 58 at that end of the lifting cradle 43 of the lifting gantry 3 which faces towards the lifting gantry 2. The light-receiver 58 comprises a linear array of individual light-detectors, for example photodiodes, which extends parallel to the light-transmitter 57. In this way, a grid or fan of light beams is formed between the light-emitter 57 and the light-receiver 58.

The way in which the device described above functions when the furnace waggon 4 is being loaded is as follows:

The lifting cradle 15 of the left-hand lifting gantry 2 is loaded, the approach being from the left, by a stationary conveyer which is not represented, with the aluminium parts to be sintered. In the actual situation, three aluminium sintering parts of this kind are deposited onto the roller-type conveyer system 26 of the left-hand lifting gantry in a row. In the process, the lifting cradle 15 is located at a height corresponding to the stationary conveyer.

The shelving plane on which the aluminium sintering parts are to be placed is then selected. In the situation represented in the drawings, this is the uppermost shelving plane, with which the carrying grid 12 is associated. The lifting cradle 15 of the left-hand gantry 2 is raised to a height which is slightly lower than the carrying grating 12. As the same time or beforehand, or if necessary even afterwards, the lifting cradle 43 is also brought to the same height. A check is carried out, with the aid of the light barrier apparatus formed between the light-transmitter 57 and the light-receiver 58, as to whether the space between the two upper shelving planes, that is to say between the carrying grids 11 and 12, is clear. If this is the case, the shifting cradle 45 on the right-hand gantry 3 is moved towards the left, through the intervening space between the carrying grids 11 and 12, until its left-hand end has arrived in the vicinity of the right-hand end of the lifting cradle 15 of the left-hand lifting gantry 2. The interlocking cradle 36 is now extended, with the aid of the pneumatic cylinder 41, towards the right in the view shown in the drawings; the bolts 37 and 38 move into the bolt receptacles 49, 50 on the shifting cradle 45 of the lifting gantry 3, introduction being facilitated by the rollers 39 and 40. There is now a force-locking connection between the two lifting cradles 15 and 43 of the two gantries 2, 3, which connection is capable of absorbing vertical forces.

The two lifting cradles 15, 43 are now raised synchronously, the prisms 53 of the uppermost carrying grid 12 being received by the gaps 52 of the lifting cradle 43. The synchronous nature of the movement is ensured by the fact that the control systems of the lifting cradles 15, 43 are connected as master and slave. At the end of this synchronous lifting movement, the conveyer plane defined by the conveyer rollers on the two lifting cradles 15 and 43 lies slightly above the upper faces of the prisms 53 of the carrying grid 12. The conveyer rollers of the two lifting cradles 15 and 43 are now set in rotation in such a way that the aluminium sintering parts located on the lifting cradle 15 of the left-hand lifting gantry 2 are transported onto the roller-type conveyer system 44 of the right-hand lifting gantry 3. Because of the interlocking apparatus 33, the weights of the said aluminium sintering parts are conducted away towards the floor not only via the pillars 41 of the lifting gantry on the right in FIG. 3, but also via the pillars 13 of the lifting gantry 2 on the left in FIG. 1.

The two lifting cradles 15, 43 are now lowered synchronously, the aluminium sintering parts being set down on the prisms 53 of the uppermost carrying grid 12. It is now possible to move the shifting cradle 45 of the right-hand lifting gantry 3 back again, out of the intermediate space between the two upper shelving planes of the furnace waggon 4 and into the position represented in FIG. 1. For the purpose of loading the next lowest carrying grid 11, the operations described above are repeated, but at a correspondingly lower height, at which the shifting cradle 44 of the right-hand lifting gantry 3 travels into the intervening space between the carrying grids 10 and 11.

The unloading of the finished aluminium sintering parts from the furnace waggon 4 takes place in a sequence of movements which has been reversed in an analogous manner:

Let it be assumed that the uppermost carrying grid 12 is to be unloaded. For that purpose, the shifting cradle 45 of the right-hand lifting gantry 3 is inserted from the right, with the two lifting cradles 15 and 43 at a suitable height, in the intervening space between the carrying grids 11, 12. A check has been carried out beforehand with the aid of the light barrier 57, 58 as to whether the said intervening space is clear. The adjoining ends of the two lifting cradles 15, 43 are connected in a force-locking manner with the aid of the interlocking apparatus 33. The two lifting cradles 15, 43 are now raised synchronously, the prisms 53 of the uppermost carrying grid 12 once again entering the gaps 52 of the shifting cradle 45. The aluminium sintering parts are lifted off the prisms 53 and taken over by the roller-type conveyer system 44 of the right-hand lifting gantry 3. By suitable turning, now in the opposite direction, of the conveyer rollers on the two roller-type conveyer systems 26 and 44, the aluminium sintering parts are transferred onto the lifting cradle 15 of the left-hand lifting gantry 2. The interlocking apparatus 33 can now be detached, and the shifting cradle 44 of the right-hand lifting gantry 3 moved back again into the position represented in FIG. 1.

The aluminium sintering parts located on the lifting cradle 15 of the left-hand lifting gantry 2 are delivered towards the left, with the aid of the roller-type conveyer system 26, to the adjoining, stationary conveyer, a suitable vertical movement of the lifting cradle 15 having, if necessary, taken place beforehand.

What is claimed is:

1. Device adapted for loading firing, sintering or drying material onto, and unloading it from, the shelving frame of a furnace wagon, the said device having:

a) a first lifting device which, for its part, comprises:
   aa) a lifting cradle capable of travel in the vertical direction;
   ab) a shifting cradle carried by the lifting cradle and capable of horizontal travel in relation to the latter;
   ac) a conveyer system carried by the shifting cradle, wherein it also comprises:
b) a second lifting device which is disposed at a distance from the first lifting device such that the shelving frame is accommodated between the two lifting devices, and which comprises:
   ba) a lifting cradle capable of travel in the vertical direction;
   bb) a conveyer system carried by the lifting cradle;
c) an interlocking apparatus with the aid of which the shifting cradle of the first lifting device can be mechanically coupled, in an extended position, to the lifting cradle of the second lifting device;
d) the vertical movements of the two lifting cradles being synchronised in the period in which the shifting cradle of the first lifting device is mechanically coupled to the lifting cradle of the second lifting device by the interlocking apparatus enabling said conveyor system of said first lifting device to load and unload material to and from said shelving frame.

2. Device according to claim 1, wherein a light barrier apparatus is provided which monitors the space between the two ends, which face one another, of the shifting cradle of the first lifting device, and of the lifting cradle of the second lifting device.

3. Device according to claim 2, wherein the light barrier apparatus comprises a linear array of individual light sources and a linear array of individual light-detectors which is substantially parallel thereto.

4. Device according to claim 1, wherein the interlocking apparatus has at least one bolt which is displaceable in the horizontal direction and which is guided on the lifting cradle of the second lifting device or on the shifting cradle of the first lifting device and engages with an end region in one position in a receptacle on the shifting cradle of the first lifting device or on the lifting cradle of the second lifting device.

5. Device according to claim 4, wherein the bolt has a freely rotatable roller at its end.

6. Device according to claim 1, wherein the control systems for the lifting movements of the two lifting cradles are connected as master and slave for the purpose of synchronising the lifting movements.

* * * * *